J. JACOBSON.
Harrow.
No. 108,910.
Patented Nov. 1, 1870.
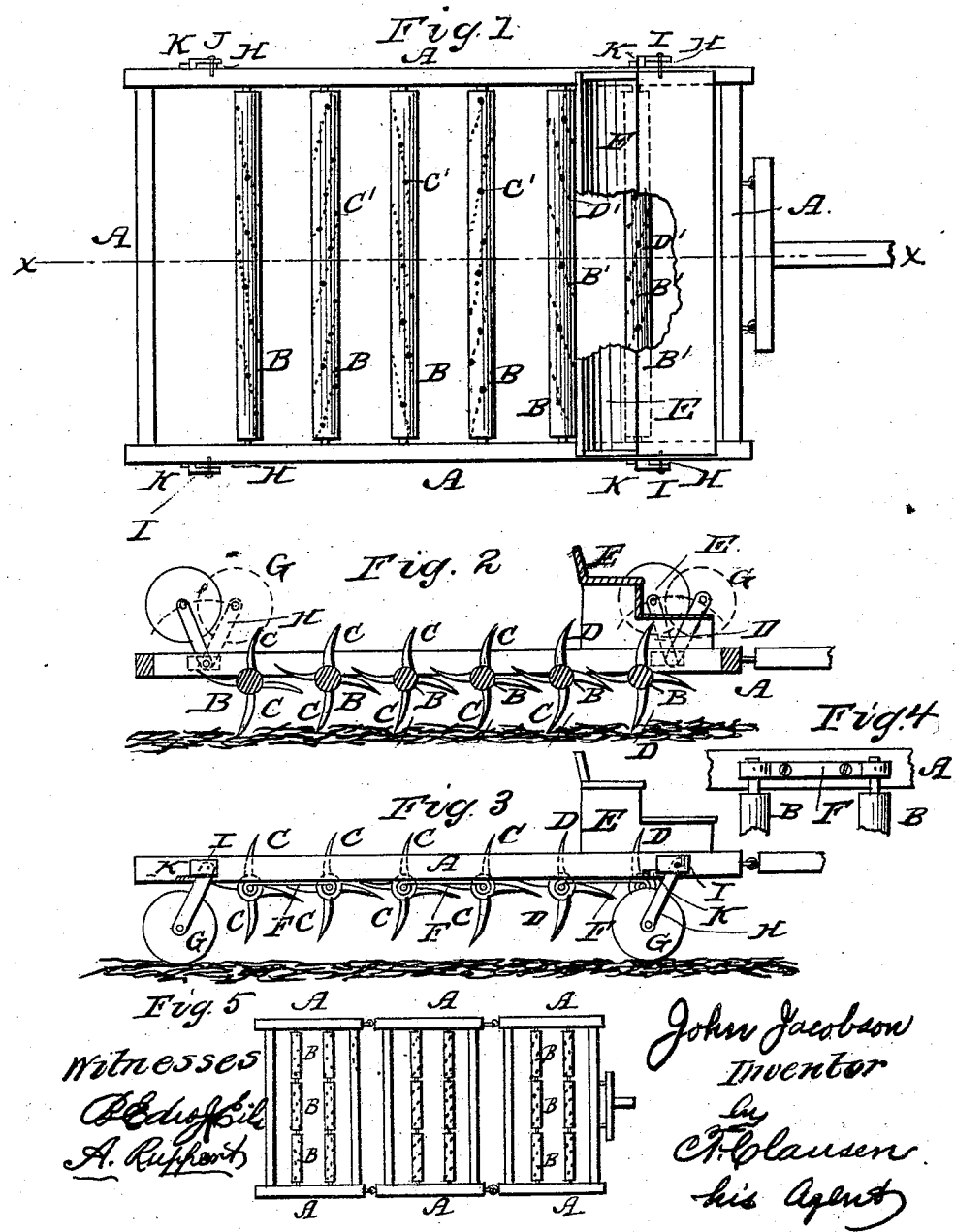

United States Patent Office.

JOHN JACOBSON, OF AUSTIN, MINNESOTA.

Letters Patent No. 108,910, dated November 1, 1870.

IMPROVEMENT IN HARROWS.

The Schedule referred to in these Letters Patent and making part of the same.

*To all whom it may concern:*

Be it known that I, JOHN JACOBSON, of Austin, in the county of Mower and in the State of Minnesota, have invented a new and useful Invention in Harrows; and I do hereby declare the following to be a full, clear, and exact description of the same, reference being had to the accompanying drawing making part of this specification, in which—

Figure 1 is a plan view of the harrow, showing the rollers without the teeth.

Figure 2 is a vertical longitudinal section on line X, fig. 1.

Figure 3 is a side elevation.

Figure 4 is part of a bottom view of the frame, showing the bearings in which the rollers rotate.

Figure 5 is a plan view of a harrow in which the frame and the rollers consist of one or more sections.

The same letters of reference employed in the several figures denote identical parts.

The nature of my invention consists in the arrangement of the teeth on the rollers, in providing the front rollers with knives instead of teeth, and in the employment of wheels attached to pivoted legs, in such a manner that the harrow may either rest on the teeth when at work, or on the wheels when at rest. The frame in which the rollers are placed may either consist of one or more parts, connected together, and the rollers may also consist of one or more parts, as will be hereafter described.

A represents a rectangular frame, supporting a series of parallel rollers B, which rest in bearings, F, secured to the lower edges of the two opposite rails of the frame, as shown in fig. 4 in the drawing.

The bearings F consist of bars of wrought-iron, at each end curved sufficiently to serve as a hub or socket, in which the axle of the rollers B and B' may be supported and rotated. The bearings F are screwed on, or otherwise secured to the frame, in such a manner that they may be attached and detached with ease.

Fig. 1 shows the apertures C' in the rollers B, into which the teeth are to be inserted. It will be observed that said apertures are placed in spiral lines around the rollers, and that the spiral line is reversed on every other roller. The teeth are placed on the different rollers, so that they shall not interfere with each other, but the teeth of one roller shall pass between the teeth of the adjoining rollers.

When the teeth are placed in above-described manner, they will break the clods of soil which may come between them with greater ease, and are not so liable to pass over them without having the desired effect, as when they are placed in straight parallel rows on the rollers.

In order to prevent brushwood, stalks, &c., from getting between and clinging to the teeth, I provide the two front rollers with knives instead of teeth, as shown in figs. 2 and 3, said knives to be about the same length, and placed in the same manner as the teeth.

The relative position of the teeth requires that the rollers are placed in couples, and, consequently, an even number of rollers have to be employed. Any shape of teeth may be used, but I prefer long teeth, the points of which are bent forward, as shown in figs 2 and 3.

The teeth C and knives D are adjustable, and either placed in sockets, secured in the apertures C' of rollers B and B', or by some other device secured in the rollers. If a tooth or knife should happen to break, or otherwise be rendered unserviceable, another tooth or knife may easily be substituted.

The seat E extends all across the width of the frame A, and ought to be large enough to prevent the driver from being thrown down on the teeth of the harrow.

G represents wheels, fastened to the legs H, which are pivoted to the outer vertical sides of the frame A, as shown in fig. 1.

When the harrow is worked the legs H are turned upward, resting against a clamp, I, placing the wheels G in a position above the frame A, as shown in fig. 2. In such a position the legs H rest on a projection formed between the clamp I and the frame A, as shown in dotted lines in figs. 2 and 3.

When the harrow is drawn from one place to another, and its teeth not desired to come in contact with the ground, then the legs H are swung downward, resting against a clamp, K, which is secured on the outside of the frame A, as shown in fig. 3, and the harrow is then resting on the wheels G, as shown in fig. 3.

Fig. 5 shows a plan view of a harrow consisting of more sections, which are hinged to each other, or by some other device so connected, that the operator may attach or detach one or more sections. The rollers B and B' are also, in the same figure, represented in sections, so that the operator may detach one or more parts.

Having thus described my invention,

What I claim, and desire to secure by Letters Patent, is—

The construction and arrangement of a harrow, the front rollers of which are provided with knives; and the other rollers of which the harrow may consist are provided with teeth, arranged substantially as and for the purpose set forth.

In testimony whereof I have signed my name to this specification in the presence of two subscribing witnesses.

JOHN JACOBSON.

Witnesses:
J. S. IRGENS,
TH. IRGENS.